United States Patent
Seo et al.

(10) Patent No.: US 10,457,268 B2
(45) Date of Patent: Oct. 29, 2019

(54) SYSTEM AND METHOD OF CONTROLLING DRIVE MOTOR FOR VEHICLE

(71) Applicants: HYUNDAI MOTOR COMPANY, Seoul (KR); KIA MOTORS CORPORATION, Seoul (KR)

(72) Inventors: Young Jin Seo, Yongin-si (KR); Hong Seok Yang, Suwon-si (KR); Yeonho Kim, Suwon-si (KR); Kyoungbum Kim, Yongin-si (KR); SangHwa Do, Seongnam-si (KR); GaEun Lee, Seongnam-si (KR); Hee Ra Lee, Anyang-si (KR); MyungKyu Jeong, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 245 days.

(21) Appl. No.: 15/621,538

(22) Filed: Jun. 13, 2017

(65) Prior Publication Data

US 2018/0126974 A1  May 10, 2018

(30) Foreign Application Priority Data

Nov. 9, 2016 (KR) .......................... 10-2016-0148700

(51) Int. Cl.
  *B60W 20/10* (2016.01)
  *B60W 10/06* (2006.01)
  (Continued)

(52) U.S. Cl.
  CPC ............... *B60W 20/10* (2013.01); *B60K 6/48* (2013.01); *B60W 10/06* (2013.01); *B60W 10/08* (2013.01);
  (Continued)

(58) Field of Classification Search
  CPC ...... B60W 20/10; B60W 20/30; B60W 20/40; B60W 30/1843; B60W 10/08; B60W 10/06; B60W 10/11
  (Continued)

(56) References Cited

U.S. PATENT DOCUMENTS

2010/0204862 A1* 8/2010 Uejima ................. B60W 20/15
                                                               701/22
2011/0232980 A1  9/2011 Nomura et al.

FOREIGN PATENT DOCUMENTS

JP  2002-335603 A  11/2002
JP  2004-028279 A   1/2004
(Continued)

OTHER PUBLICATIONS

English Translation: Kimura, JP 2008221949 A, Sep. 2008, Japanese Patent Office Publication (Year: 2008).*
(Continued)

*Primary Examiner* — Nadeem Odeh
(74) *Attorney, Agent, or Firm* — Brinks Gilson & Lione (57) ABSTRACT

A system and a method of controlling a drive motor for a vehicle is disclosed. The system of controlling a drive motor for a vehicle may include: an engine and the drive motor as power sources; a data detector detecting a state data for controlling the drive motor; and a vehicle controller setting a motor demand power and a gear stage based on the state data. In particular, the vehicle controller generates a motor demand torque based on the motor demand power and the gear stage, checks a motor temperature after driving the drive motor based on the motor demand torque, and changes the gear stage based on the motor temperature.

14 Claims, 4 Drawing Sheets

(51) Int. Cl.
  *B60W 10/08* (2006.01)
  *B60W 10/11* (2012.01)
  *B60W 20/40* (2016.01)
  *B60K 6/48* (2007.10)
  *B60W 30/184* (2012.01)
  *B60W 20/30* (2016.01)

(52) U.S. Cl.
  CPC ............ *B60W 10/11* (2013.01); *B60W 20/30* (2013.01); *B60W 20/40* (2013.01); *B60W 30/1843* (2013.01); *B60K 2006/4825* (2013.01); *B60W 2510/081* (2013.01); *B60W 2510/083* (2013.01); *B60W 2510/085* (2013.01); *B60W 2510/087* (2013.01); *B60W 2520/10* (2013.01); *B60W 2550/142* (2013.01); *B60W 2710/081* (2013.01); *B60W 2710/083* (2013.01); *B60W 2710/086* (2013.01); *B60W 2710/088* (2013.01); *B60W 2710/1005* (2013.01); *Y02T 10/6221* (2013.01); *Y02T 10/6252* (2013.01); *Y02T 10/6286* (2013.01); *Y02T 10/7258* (2013.01); *Y10S 903/93* (2013.01)

(58) Field of Classification Search
  USPC .......................................................... 701/22
  See application file for complete search history.

(56) References Cited

FOREIGN PATENT DOCUMENTS

| | | | |
|---|---|---|---|
| JP | 2006144843 A | * | 6/2006 |
| JP | 2007-106326 A | | 4/2007 |
| JP | 2008-143431 A | | 6/2008 |
| JP | 2008-221949 A | | 9/2008 |
| JP | 2008222222 A | * | 9/2008 |
| JP | 5757256 B | | 7/2015 |
| KR | 100792893 B1 | * | 1/2008 |
| KR | 10-1341185 B | | 12/2013 |

OTHER PUBLICATIONS

English Translation: Yamanaka, JP 2008222222 A, Sep. 2008, Japanese Patent Office Publication (Year: 2008).*
English Translation: Oh, KR 100792893 B2, Jan. 2008, Korean Patent Office Publication (Year: 2008).*
English Translation: Kashiwa, JP 2006144843 A, Jun. 2006, Japanese Patent Office Publication (Year: 2006).*

* cited by examiner

FIG. 4

SYSTEM AND METHOD OF CONTROLLING DRIVE MOTOR FOR VEHICLE

CROSS-REFERENCE TO RELATED APPLICATION

This application claims priority to and the benefit of Korean Patent Application No. 10-2016-0148700, filed on Nov. 9, 2016, which is incorporated herein by reference in its entirety.

FIELD

The present disclosure relates to a system of controlling a drive motor for a vehicle, and particularly to a system and a method of controlling a drive motor for a vehicle that can improve drivability and fuel economy.

BACKGROUND

The statements in this section merely provide background information related to the present disclosure and may not constitute prior art.

As pollution is getting more serious, use of non-polluting energy becomes more important. Particularly, air pollution in a big city is getting more serious. One of major causes of air pollution is exhaust gas of vehicles.

In order to solve such problems due to exhaust gas and enhance fuel economy, environmentally-friendly vehicles have been developed and used.

The environmentally-friendly vehicles include hybrid electric vehicles that use a drive motor and an engine as power sources, plug-in hybrid electric vehicles (PHEVs) provided with a high voltage battery of large capacity and charged by external electricity, and etc.

The environmentally-friendly vehicles provide various driving modes such as electric vehicle (EV) mode where torque of the drive motor is used for running, hybrid electric vehicle (HEV) mode where both of the engine torque and the motor torque are used for running, charge mode where the engine is operated to charge a battery, and etc.

The drive motor includes components such as a permanent magnet and a coil for outputting power. The components may be thermally degraded in non-reversible manner at a high temperature condition higher than a certain temperature.

Therefore, if a motor temperature of the environmentally-friendly vehicle is higher than or equal to a reference temperature, overheating of the motor is prevented by reducing a motor output or stopping the motor and the environmentally-friendly vehicle runs using the engine. According to conventional arts, a region where the vehicle runs at EV mode may be reduced due to protection logic against overheating the motor, and marketability of the environmentally-friendly vehicle may be deteriorated due to frequent drive of the engine.

The above information disclosed in this Background section is only for enhancement of understanding of the background of the present disclosure and therefore it may contain information that does not form the prior art that is already known in this country to a person of ordinary skill in the art.

SUMMARY

The present disclosure provides a system and a method of controlling a drive motor for a vehicle having advantages of reducing or preventing overheating of the drive motor by controlling a gear ratio.

Another form of the present disclosure provides a system and a method of controlling a drive motor for a vehicle having further advantages of inhibiting or preventing temperature rise of the drive motor by decreasing a motor torque.

In one exemplary form of the present disclosure, a system of controlling a drive motor for a vehicle may include: an engine and the drive motor as power sources; a data detector configured to detect a state data for controlling the drive motor; and a vehicle controller configured to: set a motor demand power and a gear stage based on the state data, generate a motor demand torque based on the motor demand power and the gear stage, check a motor temperature after driving the drive motor based on the motor demand torque, and change the gear stage based on the motor temperature.

Further, the vehicle controller may lower the gear stage when the motor temperature is higher than or equal to a reference temperature.

Further, the vehicle controller may detect a motor power and a motor torque of the drive motor after driving the drive motor, and may detect the motor temperature when the motor power and the motor torque are equal to the motor demand power and the motor demand torque, respectively.

Further, the vehicle controller may operate the engine when the motor power is not equal to the motor demand power or when the motor torque is not equal to the motor demand torque.

Further, the vehicle controller may set a motor rotation speed based on the gear stage, generate the motor demand torque based on the motor demand power and the motor rotation speed, and set a motor control current based on the motor demand torque.

Further, the vehicle controller may set a final motor current based on the motor demand torque and the motor temperature when the motor temperature is lower than a reference temperature.

Further, the data detector may include at least one of a speed detector configured to detect a vehicle speed or a gradient detector configured to detect a gradient of a road.

Further, the system of controlling a motor for a vehicle may further include a motor state detector configured to detect at least one of a temperature, a torque, or an output, of the drive motor.

In another form of the present disclosure, a method of controlling a drive motor may include: setting, by a vehicle controller, a motor demand power and a gear stage based on a state data; generating, by the vehicle controller, a motor demand torque based on the motor demand power and the gear stage; controlling, by a motor controller, the drive motor based on the motor demand torque; detecting, by a motor state detector, a motor temperature of the drive motor; and changing, by the vehicle controller, the gear stage by comparing the motor temperature with a reference temperature.

Since a temperature rise of a drive motor is inhibited or prevented by adjusting a gear ratio in exemplary forms of the present disclosure, a region where a vehicle runs with electrical energy may be increased and thus marketability and fuel efficiency of an environmentally-friendly vehicle may be improved.

Since power loss due to current can be reduced by reducing a motor torque, efficiency of high powered components such as a drive motor and an inverter may be enhanced.

Further, the effects which may be obtained or predicted by the exemplary form of the present disclosure will be explicitly or implicitly disclosed in the detailed description of the forms of the present disclosure. That is, various effects which are predicted by the exemplary forms of the present disclosure will be disclosed in the detailed description to be described below.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an operating principle of a system and a method of controlling a drive motor for a vehicle according to an exemplary form of the present disclosure will be described with reference to the accompanying drawings.

Further, in describing below exemplary forms of the present disclosure, well-known functions or constructions will not be described in detail since they may unnecessarily obscure the understanding of the present disclosure. Further, the following terminologies are defined in consideration of the functions in the present disclosure and may be construed in different ways by the intention of users and operators, practice, or the like. Therefore, the definitions thereof should be construed based on the contents throughout the specification.

Further, to effectively describe core technical features of the present disclosure, terms may be appropriately changed, integrated, or separated for those skilled in the art in a technical field to which the present disclosure belongs to explicitly understand the present disclosure, but the present disclosure is not limited thereto.

Figure 1:
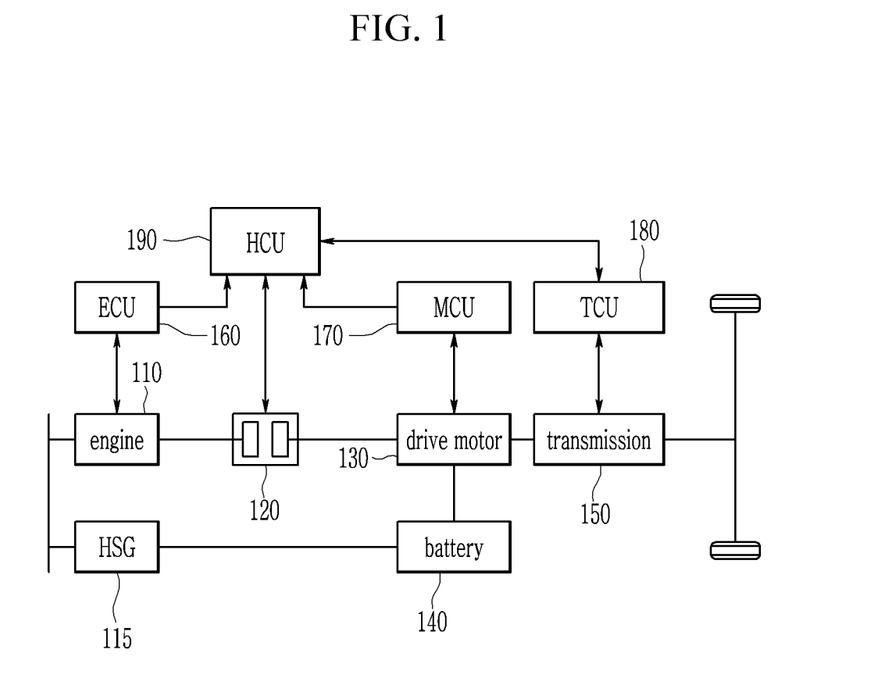
FIG. 1 is a diagram illustrating main constituent elements of an environmentally-friendly vehicle to which a system of controlling a drive motor is applicable.

FIG. 1 is a diagram illustrating main constituent elements of environmentally-friendly vehicle to which a system of controlling a drive motor in an exemplary form of the present disclosure is applicable.

For better comprehension and ease of description, a hybrid electric vehicle is illustrated as one example of environmentally-friendly vehicles in FIG. 1. However, a system of controlling a drive motor for a vehicle in an exemplary form of the present disclosure can be applied to any environmentally-friendly vehicle using a motor as power source as well as a hybrid electric vehicle illustrated in FIG. 1.

Referring to FIG. 1, an environmentally-friendly vehicle, to which a system of controlling a drive motor is applicable, may include an engine 110, a hybrid integrated starter-generator 115 (it will hereinafter be called 'HSG'), an engine clutch 120, a drive motor 130, a battery 140, a transmission 150, an engine controller 160 (it will hereinafter be called 'ECU'), a motor controller 170 (it will hereinafter be called 'MCU'), a transmission controller 180 (it will hereinafter be called 'TCU') and a hybrid controller 190 (it will hereinafter be called 'HCU').

The engine 110 burns fuel to generate power. That is, the engine 110 may be any one of well-known various engines such as a gasoline engine and a diesel engine, etc. using a typical fossil fuel. Power of the engine 110 may be transmitted toward the transmission 150.

The HSG 115 starts the engine 110, or operates as a generator to generate electrical energy when the engine 110 is operated.

The engine clutch 120 is disposed between the engine 110 and the drive motor 130 and is operated by control of the HCU 190 to operably connect or disconnect the engine 110 and the drive motor 130. That is, the engine clutch 120 operably connects or disconnects the engine 110 and the drive motor 130 according to switching between EV mode and HEV mode.

The drive motor 130 may be operated by three-phase AC voltage supplied from the battery 140 through an inverter (not shown) to generate torque. The drive motor 130 is operated as a generator to supply regenerative energy to the battery 140 in coasting or regenerative braking states.

The battery 140 includes a plurality of unit cells, and high voltage for supplying driving voltage to the drive motor 130 is stored in the battery 140. The battery 140 supplies the driving voltage to the drive motor 130 at the EV mode or the HEV mode, and is charged by voltage generated in the drive motor 130 in the regenerative braking state.

The transmission 150 receives output torque of the engine 110 when the engine clutch 120 is engaged, or output torque of the drive motor 130, and changes the output torque of the engine 110 and/or the output torque of drive motor 130 into target torque. That is, a suitable gear stage is selected according to a vehicle speed and a driving condition, and the received output torque is changed into the target torque. Then, the changed target torque is output to a driving wheel as the driving torque that runs the vehicle.

The ECU 160 is connected with the HCU 190 in wire or wireless manner, and controls, together with the HCU 190, overall operations of the engine 110 based on a demand torque signal of a driver and operating state of the engine such as a coolant temperature, an engine speed, a throttle valve opening, an intake amount, an oxygen amount, an engine torque, etc. The ECU 160 transmits the operating state of the engine 110 to the HCU 190.

The MCU 170 controls operation and torque of the drive motor 130 by control of the HCU 190, and causes voltage generated by the drive motor 130 in the regenerative braking to be stored in the battery 140. The MCU 170 controls overall operation of the driver motor based on demand torque signal of the driver, running mode of the vehicle and state of charge (SOC) of the battery 140.

The TCU 180 controls a gear ratio according to output signals of the ECU 160 and the MCU 170 and determines regenerative braking amount. That is, The TCU 180 controls overall operation of the transmission 150. The TCU 180 transmits operating state of the transmission 150 to the HCU 190.

The HCU 190 is a top rank controller that determines running mode of the vehicle and controls overall operation of the vehicle. The HCU 190 controls low rank controllers connected through network. For example, the HCU 190 may be connected to the low rank controllers through controller area network (CAN). The HCU 190 gathers and analyzes information of the low rank controllers and controls the output torques of the engine 110 and/or the drive motor 130 cooperatively with the low rank controllers.

Since general operation of the environmentally-friendly vehicle supporting the above-mentioned functions is the same as or is similar to that of a conventional hybrid electric vehicle, detailed description thereof will be omitted.

Figure 2:
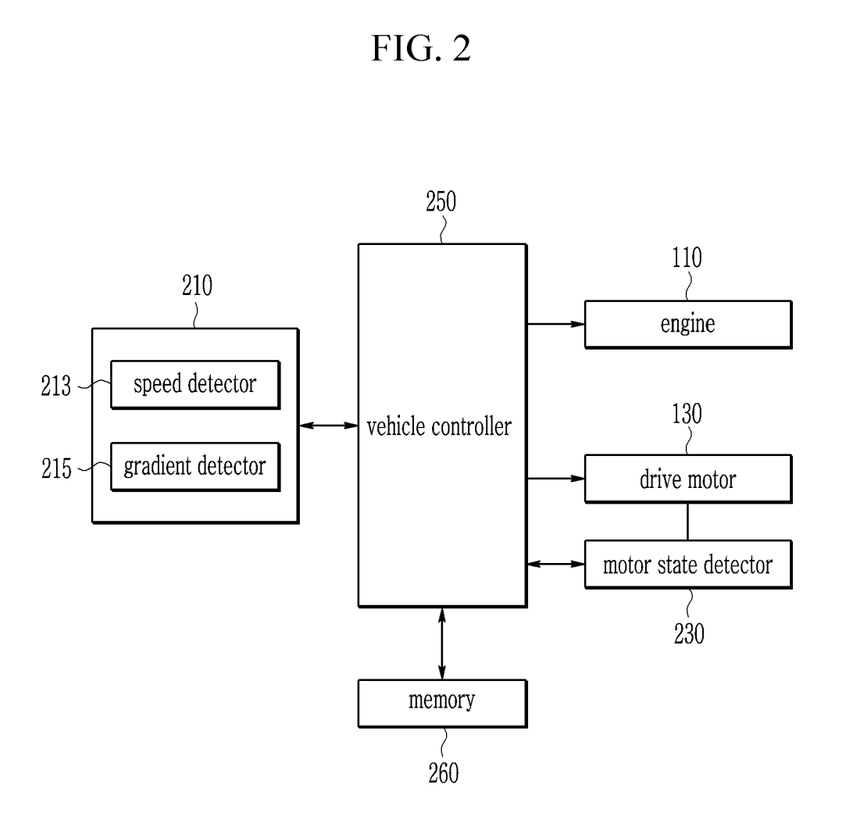
FIG. 2 is a block diagram of a system of controlling a drive motor for a vehicle.
Figure 3:
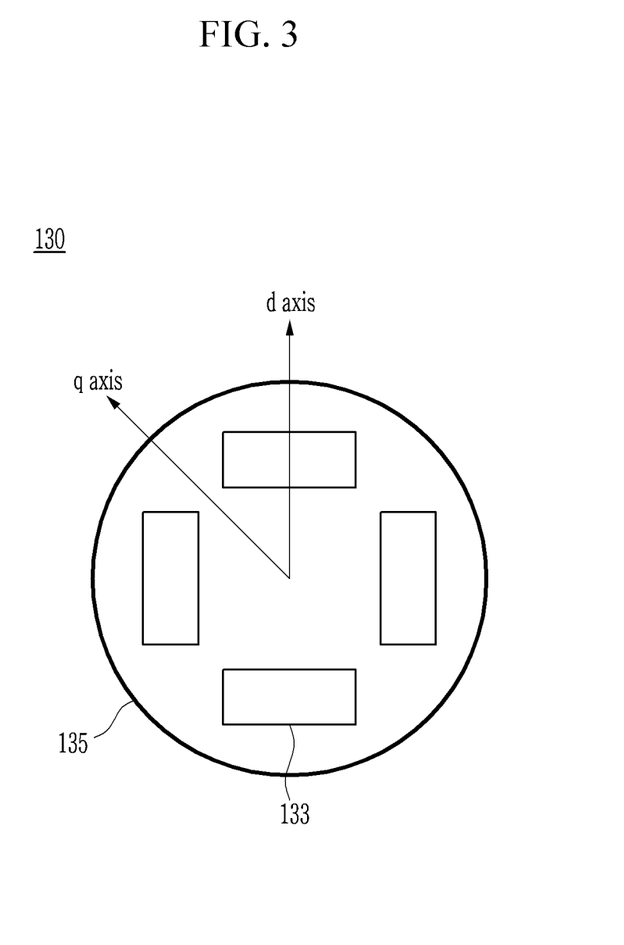
FIG. 3 is a diagram illustrating a drive motor in a system of controlling a drive motor for a vehicle.

FIG. 2 is a block diagram of a system of controlling a drive motor for a vehicle in an exemplary form of the present disclosure, and FIG. 3 is a diagram illustrating a drive motor in a system of controlling a drive motor for a vehicle in an exemplary form of the present disclosure. Some steps of a method of controlling a drive motor in the exemplary form of the present disclosure may be performed by the MCU 170 and other steps thereof may be performed by the HCU 190. Further, since the MCU 170 and the HCU 190 may be embodied as one vehicle controller 250 in one form of the present disclosure, for convenience, the MCU 170 and the HCU 190 will be called as the vehicle controller 250, unless explicitly described otherwise in the present disclosure.

Referring to FIG. 2, the system of controlling a drive motor for a vehicle includes the drive motor 130, the engine 110, a data detector 210, a motor state detector 230, the vehicle controller 250, and a memory 260.

The drive motor 130 is operated by three-phase AC voltage applied from the vehicle controller 250 to generate the torque. The drive motor 130, as shown in FIG. 3, may be embodied as an interior permanent magnet (IPM) type in which a magnet 133 is inserted in a rotor core 135. However, the drive motor 130 is not limited to the IPM type.

The engine 110 burns fuel by control of the vehicle controller 250 to generate power.

The data detector 210 detects state data for controlling the drive motor. For this purpose, the data detector 210 includes a speed detector 213 and a gradient detector 215.

The speed detector 213 detects a vehicle speed and transmits the detected vehicle speed to the vehicle controller 250. The speed detector 213 may be mounted on a wheel of the vehicle. If the speed detector 213 is not provided, the vehicle controller 250 may calculate the vehicle speed using a GPS signal received from a GPS.

The speed detector 213 detects the vehicle speed periodically or non-periodically according to control of the vehicle controller 250.

The gradient detector 215 detects a gradient of a road on which the vehicle is positioned and transmits the detected gradient to the vehicle controller 250. The gradient detector 215 detects the gradient periodically or non-periodically according to control of the vehicle controller 250.

The motor state detector 230 detects a state of the drive motor 130. In other words, the motor state detector 230 detects a temperature of the drive motor 130 (motor temperature) according to control of the vehicle controller 250 and transmits the motor temperature to the vehicle controller 250. The motor state detector 230 detects a motor power and/or a motor torque output from the drive motor 130 after operating the drive motor 130, and transmits the detected motor power and/or the detected motor torque to the vehicle controller 250.

The vehicle controller 250 controls the drive motor 130, the engine 110, the data detector 210, the motor state detector 230 and the memory 260 that are constituent elements of the system of controlling a drive motor for a vehicle.

In other words, the vehicle controller 250 receives the state data from data detector 210. The vehicle controller 250 sets a motor demand power and a gear stage based on the state data and generates a motor demand torque based on the motor demand power and the gear stage.

The vehicle controller 250 operates the drive motor 130 based on the motor demand torque. The vehicle controller 250 controls the motor state detector 230 to detect the power and the torque of the drive motor and receives the motor power and the motor torque from the motor state detector 230.

The vehicle controller 250 checks the motor temperature from the motor state detector 230 if the motor power and the motor torque meet predetermined criteria, and changes the preset gear stage according to the motor temperature.

For this purpose, the vehicle controller 250 may be implemented by at least one processor operated by a predetermined program, and the predetermined program may be programmed to perform a method of controlling a drive motor for a vehicle. The method of controlling a drive motor for a vehicle will be described in detail with reference to FIG. 4.

The memory 260 stores data desired to control the constituent elements of the system of controlling a drive motor for a vehicle and data generated or detected by the constituent elements of the system of controlling a drive motor for a vehicle. For example, the memory 260 may store the state data detected by the data detector 210 and may store the motor temperature, the motor power and the motor torque detected by the motor state detector 230.

The memory 260 may store a current control map and the motor demand power and the gear stage set by the vehicle controller 250. The memory 260 may store the motor demand torque generated by the vehicle controller 250.

The memory 260 may also store various programs for controlling overall operation of the system of controlling a drive motor for a vehicle.

The memory 260 may provide necessary data based on request of the data detector 210, the motor state detector 230 and the vehicle controller 250.

The memory 260 may be a unified memory or may be divided into a plurality of memories. For example, the memory 260 may be ROM (Read Only Memory), RAM (Random Access Memory) and flash memory, etc.

Hereinafter, a method of controlling the drive motor 130 for the environmentally-friendly vehicle will be described with reference to FIG. 4.

Figure 4:
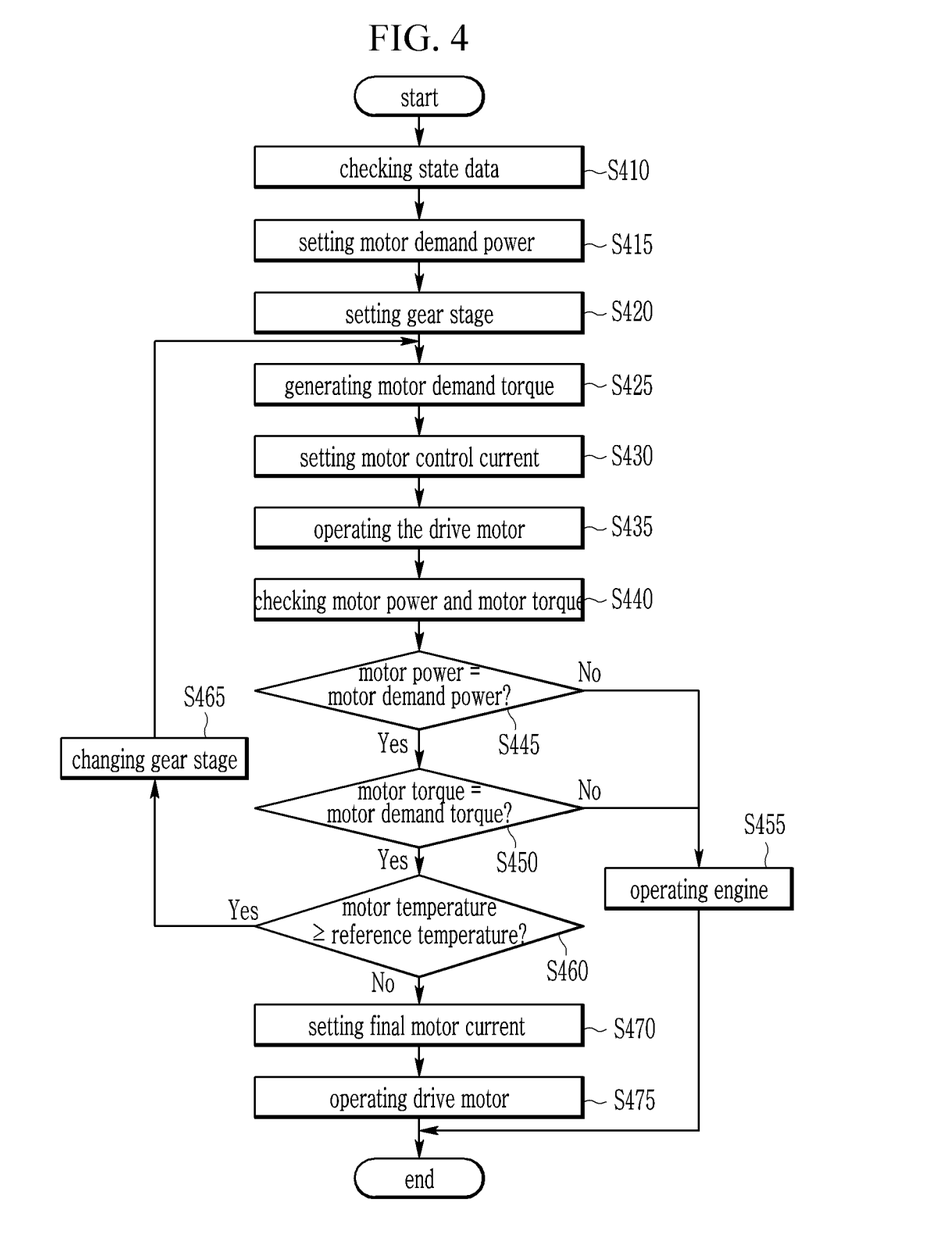
FIG. 4 is a flowchart of a method of controlling a drive motor for a vehicle.

FIG. 4 is a flowchart of a method of controlling a drive motor for a vehicle in an exemplary form of the present disclosure.

Referring to FIG. 4, the vehicle controller 250 checks the state data at step S410. In other words, the speed detector 213 of the data detector 210 detects the vehicle speed and transmits the detected vehicle speed to the vehicle controller 250. The gradient detector 215 of the data detector 210 detects the gradient of the road and transmits the gradient to the vehicle controller 250. The vehicle controller 250 checks the vehicle speed and the gradient received from the data detector 210.

The vehicle controller 250 sets the motor demand power based on the state data at step S415. That is, the vehicle controller 250 sets a power ratio of the drive motor 130 and the engine 110 based on the vehicle speed and the gradient of the state data and sets the motor demand power that will be output from the drive motor 130 according to the power ratio.

The vehicle controller 250 sets the gear stage based on the state data at step S420. That is, the vehicle controller 250 sets the gear stage based on the vehicle speed of the state data. At this time, the vehicle controller 250 may set the gear stage according to the vehicle speed through a gear control map. The gear control map includes gear stages matched to each of a plurality of vehicle speeds.

The vehicle controller 250 generates the motor demand torque based on the motor demand power and the gear stage at step S425. In other words, the vehicle controller 250 sets a motor rotation speed based on the gear stage. At this time, the motor rotation speed represents a rotation speed with which the drive motor 130 will rotate. In addition, the vehicle controller 250 generates the motor demand torque based on the motor rotation speed and the motor demand power. That is, the vehicle controller 250 generates the motor demand torque through following [Equation 1].

$$T=P/N \quad \text{[Equation 1]}$$

where, T indicates the motor demand torque; P indicates the motor demand power; and N indicates the motor rotation speed.

The vehicle controller 250 sets the motor control current based on the motor demand torque at step S430. That is, the vehicle controller 250 determines and sets the motor control current matched to the motor demand torque through the current control map. Here, the current control map indicates a map in which a current for controlling the drive motor 130 is matched to each of a plurality of motor demand torques. The motor control current may include d-axis motor control current and q-axis motor control current for controlling the drive motor 130.

The vehicle controller 250 operates the drive motor 130 based on the motor control current at step S435. That is, the vehicle controller 250 controls three-phase current applied to the drive motor 130 based on the motor control current to operate the drive motor 130.

The vehicle controller 250 checks the motor power and the motor torque at step S440. In more detail, if the drive motor 130 is operated, the motor state detector 230 detects the motor power and the motor torque. The motor state detector 230 transmits the detected motor power and the detected motor torque to the vehicle controller 250. The vehicle controller 250 receives and checks the motor power and the motor torque from the motor state detector 230.

The vehicle controller 250 determines whether the motor power is the same as the motor demand power at step S445. That is, the vehicle controller 250 determines whether the motor power checked at the step S440 is equal to the motor demand power set at the step S415.

If the motor power is equal to the motor demand power, the vehicle controller 250 determines whether the motor torque is equal to the motor demand torque at step S450. That is, if the motor power is the same as the motor demand power, the vehicle controller 250 determines whether the motor torque checked at the step S440 is the same as the motor demand torque generated at the step S425.

If the motor power is not the same as the motor demand power or the motor torque is not the same as the motor demand torque, the vehicle controller 250 operates the engine 110 at step S455. The engine 110 is operated to generate the torque demanded by the driver.

If the motor torque is the same as the motor demand torque, the vehicle controller 250 determines whether the motor temperature is higher than or equal to a reference temperature at step S460. That is, if the motor torque is equal to the motor demand torque, the motor state detector 230 detects and transmits the temperature of the drive motor 130 to the vehicle controller 250. The vehicle controller 250 determines whether the motor temperature transmitted from the motor state detector 230 is higher than or equal to the reference temperature. Here, the reference temperature is a value for determining whether the temperature of the drive motor 130 inadvertently rises, and may be predetermined value. The reference temperature may be set through a predetermined algorithm (e.g., program and/or probability model).

If the motor temperature is higher than or equal to the reference temperature, the vehicle controller 250 changes the gear stage at step S465. That is, when the motor temperature is higher than or equal to the reference temperature, the vehicle controller 250 lowers the gear stage to lower the temperature of the drive motor 130. In addition, the vehicle controller 250 may return to the step S425 and may generate the motor demand torque.

When the gear stage is lowered, the motor rotation speed increases to output the same power and the demand torque of the drive motor 130 decreases. Therefore, the system of controlling a drive motor for a vehicle lowers the motor control current for controlling the drive motor 130. Since the system of controlling a motor for a vehicle reduces heat generation of the drive motor 130, a distance and a time where the vehicle runs by using the drive motor 130 is increased. As a result, fuel economy may be improved.

If the motor temperature is lower than the reference temperature, the vehicle controller 250 sets a final motor current at step S470. In other words, when the motor temperature is lower than the reference temperature, the vehicle controller 250 sets the final motor current based on the motor demand torque and the motor temperature to operate the drive motor 130. At this time, the vehicle controller 250 may determine the final motor current corresponding to the motor demand torque and the motor temperature through a motor control map. The final motor current includes d-axis final motor current and q-axis final motor current for controlling the drive motor 130. In addition, the final motor current may be the same as, but not limited to, the motor control current set as the step S430.

The vehicle controller 250 operates the drive motor 130 using the final motor current at step S475. That is, the vehicle controller 250 controls three-phase current applied to the drive motor 130 based on the final motor current to operate the drive motor 130.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A system of controlling a drive motor for a vehicle which includes an engine and the drive motor as power sources, the system comprising:
   a data detector including a plurality of sensors configured to detect a state data for controlling the drive motor; and a vehicle controller configured to:
  set a motor demand power and a gear stage based on the state data,
  generate a motor demand torque based on the motor demand power and the gear stage,
  detect a motor power and a motor torque of the drive motor after driving the drive motor,
  check a motor temperature when the motor power and the motor torque are equal to the motor demand power and the motor demand torque, respectively, after driving the drive motor, and
  change the gear stage based on the motor temperature.

2. The system of claim 1, wherein the vehicle controller is configured to lower the gear stage when the motor temperature is higher than or equal to a reference temperature.

3. The system of claim 1, wherein the vehicle controller is configured to operate the engine when the motor power is not equal to the motor demand power or when the motor torque is not equal to the motor demand torque.

4. The system of claim 1, wherein the vehicle controller is configured to set a motor rotation speed based on the gear stage, generate the motor demand torque based on the motor demand power and the motor rotation speed, and to set a motor control current based on the motor demand torque.

5. The system of claim 1, wherein the vehicle controller is configured to set a final motor current based on the motor demand torque and the motor temperature when the motor temperature is lower than a reference temperature.

6. The system of claim 1, wherein the plurality of sensors comprise a speed sensor configured to detect a vehicle speed, and a gradient sensor configured to detect a gradient of a road.

7. The system of claim 1, further comprising a motor state detector including at least one of a temperature sensor configured to detect the motor temperature, or a motor output sensor configured to detect at least one of the motor torque of the drive motor and the motor power of the drive motor.

8. A method of controlling a drive motor in a system including an engine and the drive motor as power sources, the method comprising:
  setting, by a vehicle controller, a motor demand power and a gear stage based on a state data;
  generating, by the vehicle controller, a motor demand torque based on the motor demand power and the gear stage;
  controlling, by a motor controller, the drive motor based on the motor demand torque;
  detecting, by a motor state detector including a plurality of sensors, a motor temperature of the drive motor; and
  changing, by the vehicle controller, the gear stage by comparing the motor temperature with a reference temperature,
  wherein the detecting the motor temperature of the drive motor comprises:
    detecting a motor power and a motor torque of the drive motor;
    determining whether the motor power is equal to the motor demand power;
    determining whether the motor torque is equal to the motor demand torque when the motor power is equal to the motor demand power; and
    detecting the motor temperature when the motor torque is equal to the motor demand torque.

9. The method of claim 8, wherein the changing the gear stage comprises:
  determining whether the motor temperature is higher than or equal to the reference temperature; and
  lowering the gear stage when the motor temperature is higher than or equal to the reference temperature.

10. The method of claim 9, further comprising: after the determining whether the motor temperature is higher than or equal to the reference temperature,
  setting a final motor current based on the motor demand torque and the motor temperature when the motor temperature is lower than the reference temperature.

11. The method of claim 8, wherein the generating the motor demand torque comprises:
  setting a motor rotation speed based on the gear stage; and
  generating the motor demand torque based on the motor demand power and the motor rotation speed.

12. The method of claim 8, further comprising: after the determining whether the motor power is equal to the motor demand power,
  driving the engine when the motor power is not equal to the motor demand power.

13. The method of claim 8, further comprising: after the determining whether the motor torque is equal to the motor demand torque,
  driving the engine when the motor torque is not equal to the motor demand torque.

14. The method of claim 8, wherein the controlling the drive motor based on the motor demand torque comprises:
  setting a motor control current based on the motor demand torque; and
  driving the drive motor based on the motor control current.

* * * * *